US012695140B2

(12) United States Patent
Jung et al.

(10) Patent No.: US 12,695,140 B2
(45) Date of Patent: Jul. 28, 2026

(54) CYLINDRICAL SECONDARY BATTERY

(71) Applicant: Samsung SDI Co., Ltd., Yongin-si (KR)

(72) Inventors: Hyun Ki Jung, Yongin-si (KR); Woo Hyuk Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 740 days.

(21) Appl. No.: 18/096,493

(22) Filed: Jan. 12, 2023

(65) Prior Publication Data

US 2023/0231235 A1 Jul. 20, 2023

(30) Foreign Application Priority Data

Jan. 19, 2022 (KR) ........................ 10-2022-0007826

(51) Int. Cl.
| | |
|---|---|
| *H01M 50/107* | (2021.01) |
| *H01M 10/0585* | (2010.01) |
| *H01M 50/152* | (2021.01) |
| *H01M 50/167* | (2021.01) |
| *H01M 50/183* | (2021.01) |

(52) U.S. Cl.
CPC ..... *H01M 50/107* (2021.01); *H01M 10/0585* (2013.01); *H01M 50/152* (2021.01); *H01M 50/167* (2021.01); *H01M 50/183* (2021.01)

(58) Field of Classification Search
CPC ........... H01M 50/107; H01M 10/0585; H01M 50/152; H01M 50/167; H01M 50/183; H01M 50/186; H01M 50/559; H01M 50/566; H01M 50/55; H01M 50/179; H01M 50/503; H01M 50/528; H01M 50/166;

(Continued)

(56) References Cited

U.S. PATENT DOCUMENTS

| | | |
|---|---|---|
| 6,524,739 B1 | 2/2003 | Iwaizono et al. |
| 7,927,734 B2 | 4/2011 | Kim et al. |

(Continued)

FOREIGN PATENT DOCUMENTS

| | | |
|---|---|---|
| CN | 1275249 A | 11/2000 |
| CN | 1495932 A | 5/2004 |

(Continued)

OTHER PUBLICATIONS

Extended European Search Report issued in corresponding EP Application No. 23151508.1, dated May 23, 2023, 6 pages.

(Continued)

*Primary Examiner* — Matthew T Martin
*Assistant Examiner* — Bartholomew A Hornsby
(74) *Attorney, Agent, or Firm* — Womble Bond Dickinson (US) LLP

(57) ABSTRACT

A cylindrical secondary battery includes: an electrode assembly including a first electrode plate and a second electrode plate; a can having a bottom portion and a cylindrical side portion, accommodating the electrode assembly, and electrically connected to the first electrode plate; and a cap assembly. The cap assembly includes: a cap plate coupled to one end of the side portion of the can and electrically connected to the second electrode plate; a gasket insulating the cap plate and the side portion from each other; and a sub-plate covering at least a portion of the cap plate and at least a top portion of the side portion.

7 Claims, 6 Drawing Sheets

(58) Field of Classification Search
CPC .. H01M 50/169; H01M 50/3425; Y02E 60/10
See application file for complete search history.

(56) References Cited

U.S. PATENT DOCUMENTS

| 9,040,191 | B2 | 5/2015 | Yoon et al. | |
| 11,695,179 | B2 | 7/2023 | Bae | |
| 2004/0121229 | A1 | 6/2004 | Kim et al. | |
| 2009/0087733 | A1 | 4/2009 | Yoon et al. | |
| 2018/0241014 | A1* | 8/2018 | Murase | H01M 50/593 |
| 2020/0083494 | A1* | 3/2020 | Bae | H01M 50/55 |

FOREIGN PATENT DOCUMENTS

| CN | 1554132 | A | 12/2004 | | |
| CN | 101404338 | A | 4/2009 | | |
| CN | 109997244 | A | 7/2019 | | |
| JP | 2012-155957 | A | 8/2012 | | |
| JP | 6683150 | B2 | 3/2020 | | |
| KR | 2001-0024564 | A | 3/2001 | | |
| KR | 100389968 | B1 | * | 7/2003 | H01M 10/0525 |
| KR | 10-2018-0057362 | A | 5/2018 | | |
| KR | 10-2019-0030016 | A | 3/2019 | | |
| KR | 10-2019-0112509 | A | 10/2019 | | |
| KR | 10-2159974 | B1 | 9/2020 | | |
| KR | 10-2021-0021839 | A | 3/2021 | | |

OTHER PUBLICATIONS

Chinese Office Action issued in CN Application No. 202310065452.
7, dated Oct. 30, 2025, 11 pages.

* cited by examiner

190:191~195

190:191~196

CYLINDRICAL SECONDARY BATTERY

CROSS-REFERENCE TO RELATED APPLICATION

This application claims priority to and the benefit of Korean Patent Application No. 10-2022-0007826, filed on Jan. 19, 2022, in the Korean Intellectual Property Office, the entire content of which is herein incorporated by reference.

BACKGROUND

1. Field

Aspects of embodiments of the present disclosure relate to a cylindrical secondary battery.

2. Description of the Related Art

Generally, a cylindrical secondary battery includes a cylindrical electrode assembly, a cylindrical can accommodating the electrode assembly and an electrolyte, and a cap assembly coupled to an upper opening of the case to seal the can and allowing the current generated in (or stored in) the electrode assembly to flow to an external device.

A cylindrical secondary battery may have a structure in which the case (e.g., the can), acting as a negative electrode, and a cap assembly, acting as a positive electrode, are insulated from each other by a gasket. In this configuration, the negative electrode is generally provided below (or at a lower side or end of) the battery. However, in some cases, both the negative electrode and the positive electrode should be provided at one side of the battery. In such cases, an area to weld a negative electrode terminal is narrow.

The above information disclosed in this Background section is for enhancement of understanding of the background of the present disclosure, and therefore, it may contain information that does not constitute prior art.

SUMMARY

An embodiment of the present disclosure provides a cylindrical secondary battery in which a positive electrode and a negative electrode are provided in one direction (e.g., at one end of the battery) and have improved structures.

According to an embodiment of the present disclosure, a cylindrical secondary battery includes: an electrode assembly including a first electrode plate and a second electrode plate; a can having a bottom portion and a cylindrical side portion, accommodating the electrode assembly, and electrically connected to the first electrode plate; and a cap assembly. The cap assembly includes: a cap plate coupled to one end of the side portion of the can and being electrically connected to the second electrode plate; a gasket insulating the cap plate and the side portion from each other; and a sub-plate covering at least a portion of the cap plate and at least a top portion of the side portion.

The cap assembly may further include an insulation member including an insulating material and being arranged between the sub-plate and the cap plate.

The can may have a beading part adjacent an open end of the side portion and being inwardly concavely bent and a crimping part spaced apart from the beading part and being a bent end of the side portion. The sub-plate may cover at least a portion of the crimping part.

The cap plate may include a positive electrode terminal protruding outwardly from a plate surface, and the sub-plate may include a ring-shaped base between an outer edge of the positive electrode terminal and a top end of the gasket.

A width or diameter of the base may be smaller than a distance between the outer edge of the positive electrode terminal and the top end of the gasket.

The sub-plate may further include a plurality of extending portions extending outwardly from an outer edge of the base and an arc-shaped bending portion extending from an end of each of the extending portions in a circumferential direction of the base.

At least a portion of the base, at least portions of the extending portions, and the bending portion may be welded to the can.

The cylindrical secondary battery may further include: a first electrode current collector plate electrically connected to the first electrode plate and electrically connected to the bottom portion; and a second electrode current collector plate electrically connected to the second electrode plate and electrically connected to the cap plate. The first electrode plate may be a negative electrode plate, and the second electrode plate may be a positive electrode plate.

DETAILED DESCRIPTION

Figure 1:
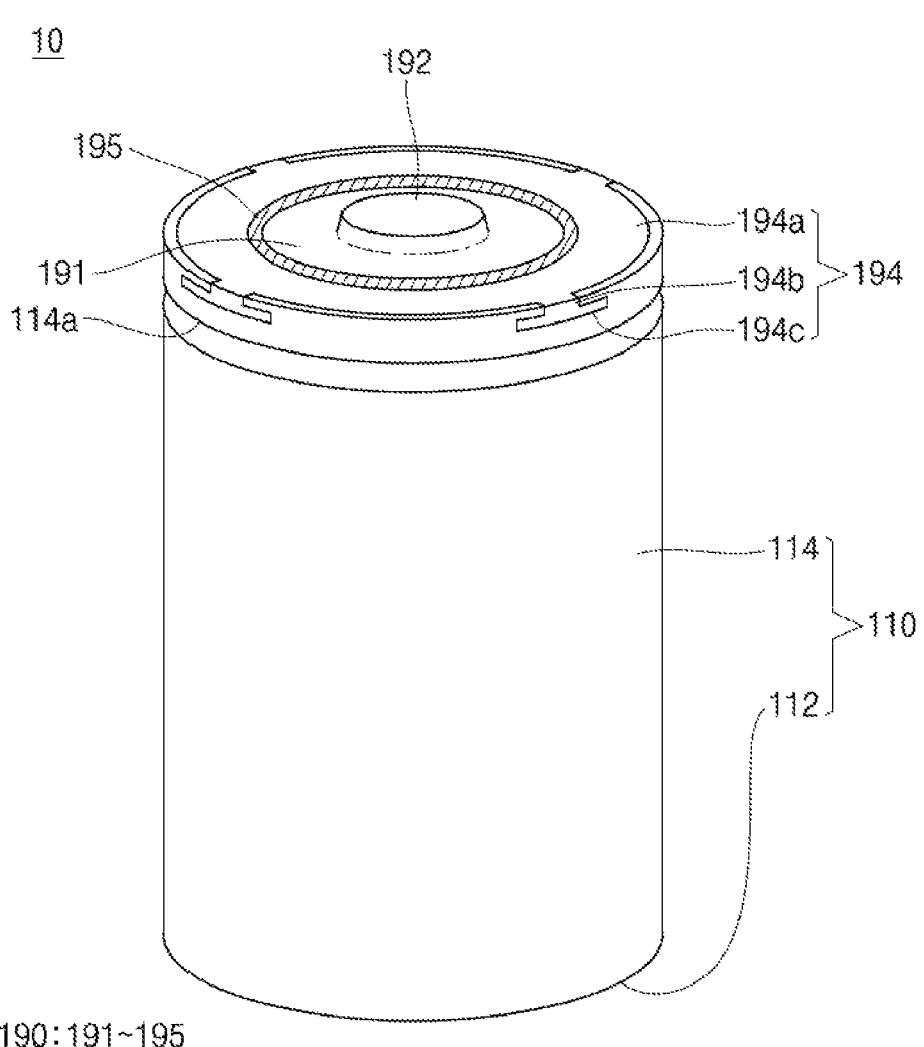
FIG. 1 is a perspective view of a cylindrical secondary battery according to an embodiment of the present disclosure.

Embodiments of the present disclosure are provided to more completely describe the aspects and features of present disclosure to those skilled in the art, and the following embodiments may be modified in various other forms. Accordingly, the present disclosure may be embodied in many different forms and should not be construed as being limited to the embodiments set forth herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, a cylindrical secondary battery according to an embodiment of the present disclosure will be described, in detail, with reference to the accompanying drawings. Herein, the upper portion is defined as an upper side or upper-side direction with reference to FIGS. 1 and 2, and the lower portion is defined as a lower side or lower-side direction with reference to FIGS. 1 and 2.

Figure 2:
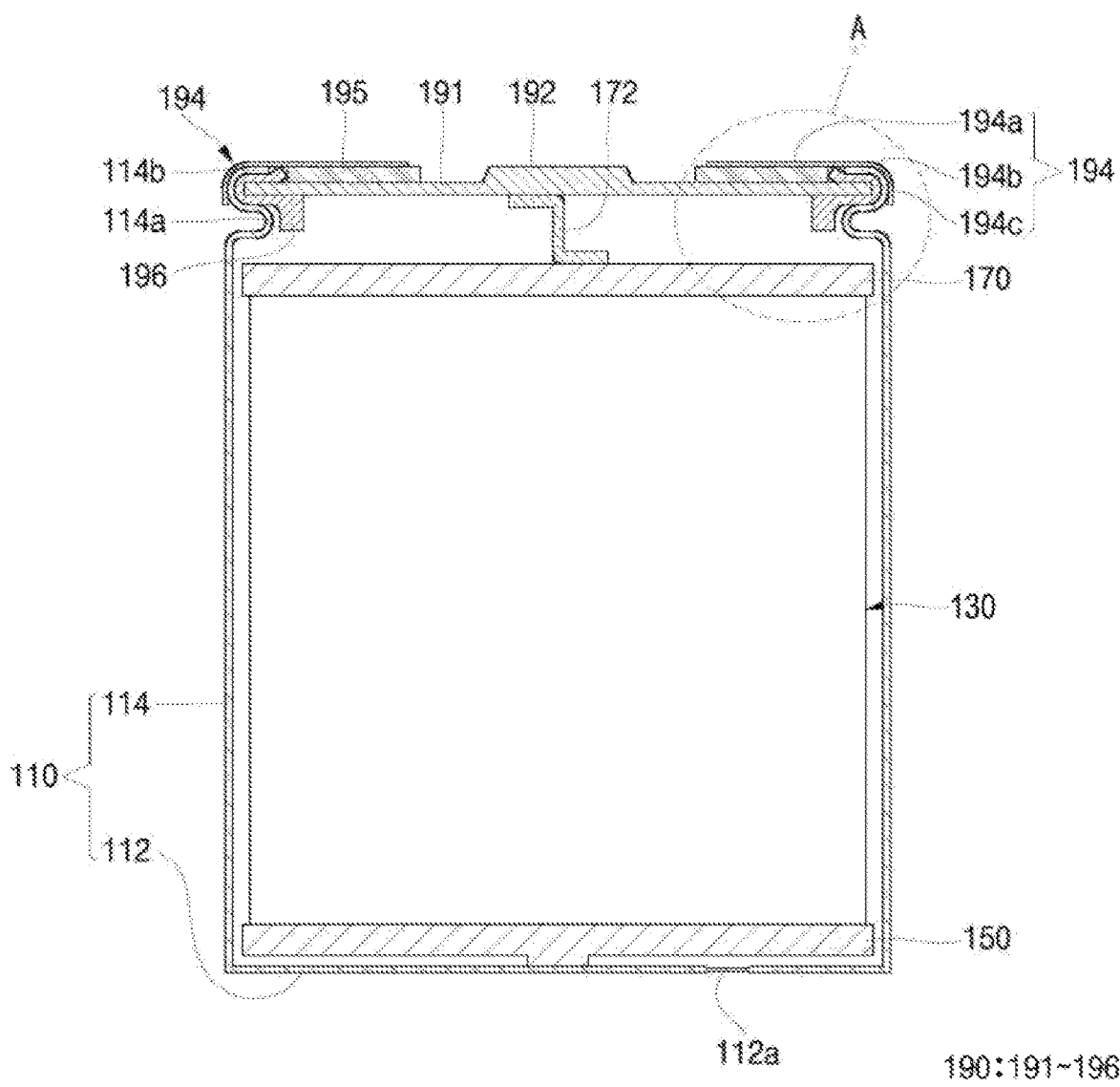
FIG. 2 is a cross-sectional view of the cylindrical secondary battery shown in FIG. 1.
Figure 3:
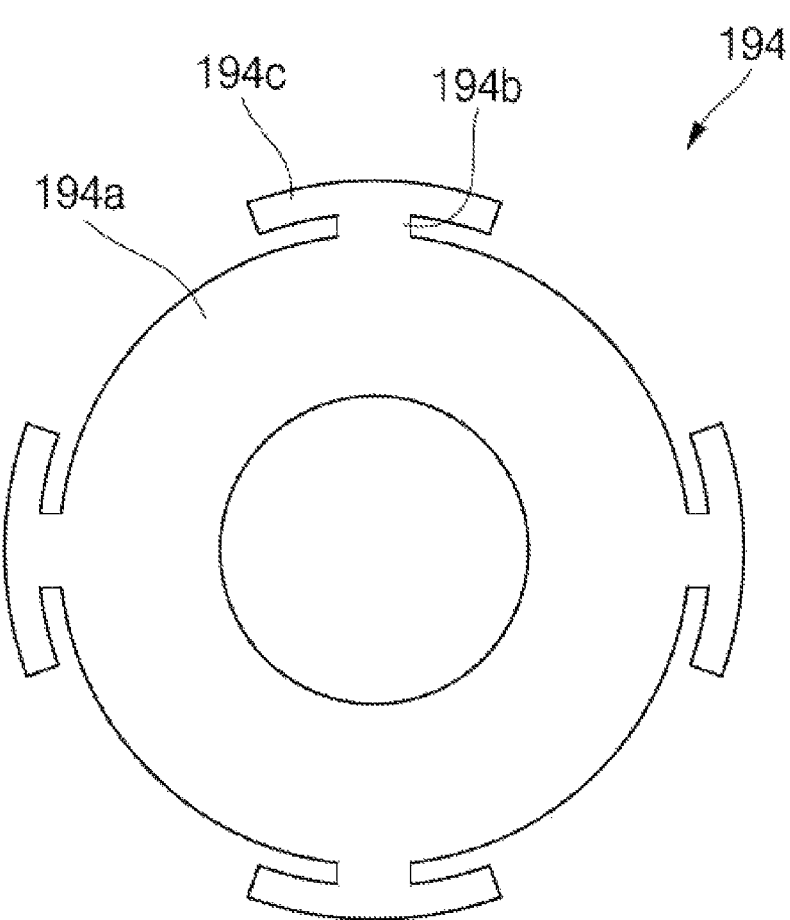
FIG. 3 is a plan view of a sub-plate shown in FIG. 1.
Figure 4:
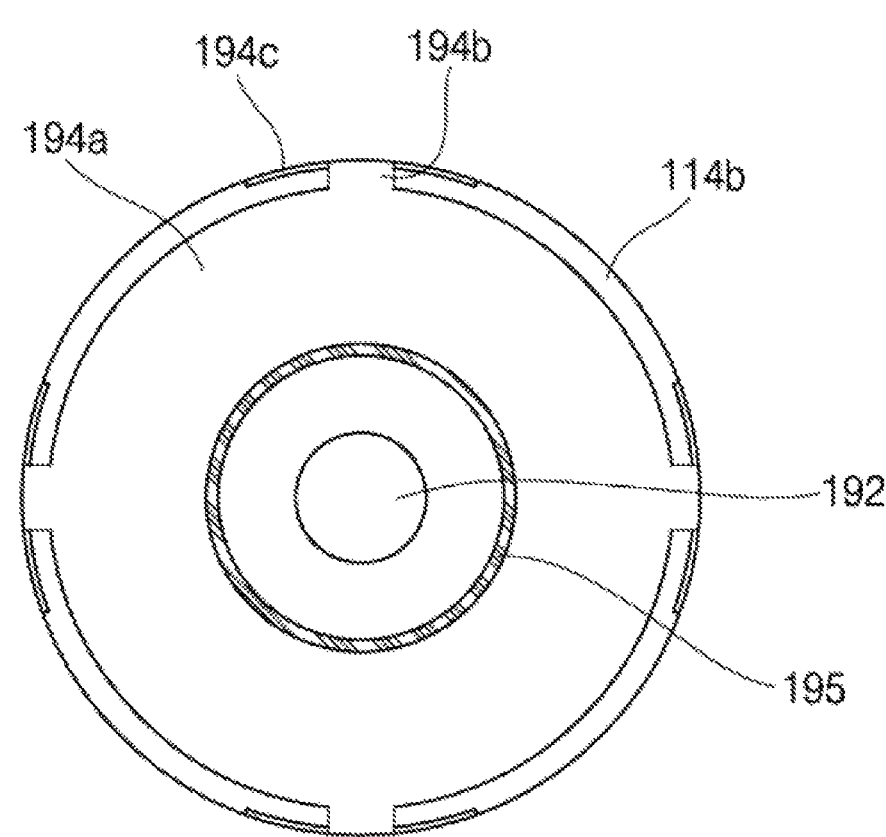
FIG. 4 is a plan view of a cylindrical secondary battery to which the sub-plate shown in FIG. 3 is coupled.
Figure 5:
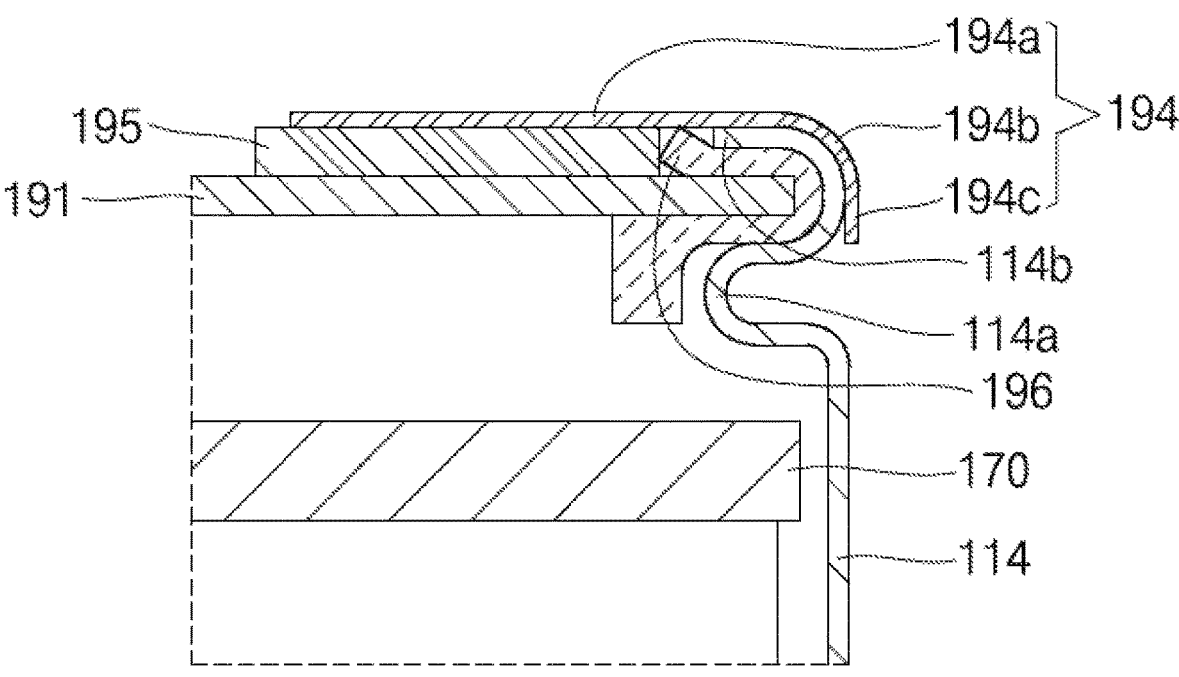
FIG. 5 is an enlarged view of the portion A of FIG. 2.

FIG. 1 is a perspective view of a cylindrical secondary battery according to an embodiment of the present disclosure. FIG. 2 is a cross-sectional view of the cylindrical secondary battery shown in FIG. 1. FIG. 3 is a plan view of a sub-plate shown in FIG. 1. FIG. 4 is a plan view of a cylindrical secondary battery to which the sub-plate shown in FIG. 3 is coupled. FIG. 5 is an enlarged view of the portion A of FIG. 2.

As shown in FIGS. 1 and 2, the cylindrical secondary battery 10 may include a cylindrical can 110, an electrode assembly 130 inserted into (e.g., accommodated in) the can 110, a cap assembly 190 coupled to one end of the can 110, a first electrode current collector plate 150 electrically connecting the electrode assembly 130 to the cap assembly 190, and a second electrode current collector plate 170. The cap assembly 190 will be described in more detail later.

The can 110 has a circular bottom portion 112 and a side portion 114 extending upwardly from the bottom portion 112 to form a cylindrical shape in which a top end of the side portion 114 is open (hereinafter referred to as an opening). In the manufacturing process of the secondary battery 10, the electrode assembly 130 is inserted into the can 110 together with an electrolyte through the opening in the can 110. The electrode assembly 130 may be electrically connected to the can 110 and the cap assembly 190 by (or through) the first electrode current collector plate 150 and the second electrode current collector plate 170. The can 110 may be made of steel, a steel alloy, nickel-plated steel, a nickel-plated steel alloy, aluminum, an aluminum alloy, or an equivalent thereof, but the material thereof is not limited herein.

As shown in FIGS. 1 and 2, a through hole for coupling (or providing) a vent may be formed in the bottom portion 112 of the can 110, and a vent 112a may be coupled to (e.g., may be inserted into) the through hole. The vent 112a may have a circular shape, an oval shape, or the like having a diameter (e.g., a predetermined diameter) on the circular bottom portion 112. In other embodiments, a notch (or groove) may be formed in the inner surface (e.g., a surface facing toward the electrode assembly 130) and/or in the outer surface (e.g., a surface facing the outside of the can 110) of the bottom portion 112 by forging (or machining) the inner and/or outer surfaces of the bottom portion 112. If the pressure inside the can 110 increases due to an increase in the internal pressure of a cell or the generation of gas due to internal and external factors, the vent 112a or the notch may be broken (e.g., may rupture) and the gas may be discharged. Accordingly, a vent may not be provided in the cap assembly 190, which will be described later.

As shown in FIGS. 1 and 2, a beading part (e.g., a bead) 114a that is concavely machined (or pressed) inwardly along the outer circumferential surface of the can 110 may be formed adjacent to the opening in the side portion 114. When the cap assembly 190 is seated on the beading part 114a, the top end of the can 110 is bent inwardly (e.g., is crimped) to fix the cap assembly 190. The bent end is referred to as the crimping part (e.g., the crimped end) 114b, and the crimping part 114b may be electrically connected to the cap assembly 190, which will be described later. When the electrolyte and the electrode assembly 130 are accommodated in the can 110, the cap assembly 190 may be coupled to the can at the opening therein to close the opening.

The electrode assembly 130 includes a first electrode plate, a second electrode plate, and a separator. The first electrode plate may be a negative electrode plate having a negative electrode active material layer (e.g., graphite, carbon, etc.) formed on both surfaces. A first electrode uncoated portion, at where the negative electrode active material layer is not applied, may be formed at a portion of (e.g., at an end of) the first electrode plate. The second electrode plate may be a positive electrode plate having a positive electrode active material layer (e.g., a transition metal oxide (LiCoO2, LiNiO2, LiMn2O4, etc.) formed on both surfaces. A second electrode uncoated portion, at where a positive electrode active material layer is not applied, may be formed at a portion of (e.g., at an end of) the second electrode plate. The separator may be interposed between the first electrode plate and the second electrode plate to prevent a short circuit therebetween while enabling the movement of lithium ions. The first electrode plate may be made of copper (Cu) or nickel (Ni) foil, the second electrode plate may be made of aluminum (AI) foil, and the separator may be made of polyethylene (PE) or polypropylene (PP), but the present disclosure is not limited to the materials listed herein.

The first electrode plate, the second electrode plate, and the separator may be wound in a substantially cylindrical shape and accommodated in the can 110. The first electrode plate and the second electrode plate may be arranged so that, when wound, the first electrode uncoated portion and the second electrode uncoated portion, to which the respective active materials are not applied, are disposed in opposite directions (e.g., at opposite ends of the electrode assembly).

For example, the first electrode plate, which is a negative electrode plate, may be disposed such that the first electrode uncoated portion faces downwardly with reference to FIG. 2 (e.g., toward the bottom portion 112 of the can 110). The second electrode plate, which is a positive electrode plate, may be disposed to face upwardly with reference to FIG. 2 (e.g., toward the cap assembly 190). The separator may be disposed between the first electrode plate and the second electrode plate, and when the first electrode plate and the second electrode plate are insulated by the separator, the electrode assembly 130 may be wound. Thereafter, the first electrode current collector plate 150 may be electrically connected to the first electrode uncoated portion, and the second electrode current collector plate 170 may be electrically connected to the second electrode uncoated portion. Accordingly, the can 110 and the cap assembly 190 may then be electrically connected to the electrode assembly 130 as described later.

The first electrode current collector plate 150 may be electrically connected to the bottom portion 112 of the can 110 by welding, etc. Because the first electrode current collector plate 150 is electrically connected to the first electrode uncoated portion, the first electrode current collector plate 150 may act as a negative electrode current collector plate. The second electrode current collector plate 170 may be electrically connected to the cap assembly 190 by a current collecting lead 172. Because the second electrode current collector plate 170 is electrically connected to the second electrode uncoated portion, the second electrode current collector plate 170 may act as a positive electrode current collector plate.

As shown in FIGS. 1 and 2, the cap assembly 190 may include a cap plate 191, a positive electrode terminal 192 provided at the center of the cap plate 191, a sub-plate 194 coupled to the outside of the cap plate 191, an insulation member 195 for insulating the sub-plate 194 and the cap plate 191 from each other, and a gasket 196 for insulating the cap plate 191 and the can 110 from each other.

The cap plate 191 has a substantially circular shape, and the positive electrode terminal 192 may be provided at the center of the cap plate 191. For example, the positive electrode terminal 192 may protrude to the outside of the cap plate 191. The positive electrode terminal 192 may have a cylindrical shape protruding upwardly from the center of the upper surface of the cap plate 191 with reference to FIG. 2. The positive electrode terminal 192 may be integrally formed with the cap plate 191 or may be separately formed and then coupled to the cap plate 191 by welding, etc. In the illustrated embodiment, the positive electrode terminal 192 is integrally formed with the cap plate 191 as an example.

The cap plate 191 may act as a positive electrode because it is electrically connected to the positive electrode plate of the electrode assembly 130 by (or through) the second electrode current collector plate 170, which is a positive electrode current collector plate, and the current collecting lead 172 connected thereto. In some embodiments, the positive electrode terminal 192 may not be provided (e.g., may not be provided convexly or to protrude above the cap plate 191), and only the cap plate 191 may act as a positive electrode terminal. The cap plate 191 may be made of the same or similar material as the can 110. The cap plate 191 may be seated on the beading part 114a. The outer edge of the cap plate 191 may be insulated from the side portion 114 of the can 110 by the gasket 196.

Referring to FIGS. 3 to 5, after the cap assembly 190 is fixed to the can 110, the sub-plate 194 is seated at the top end of the side portion 114. The sub-plate 194 may be made of the same or similar material as the can 110. The sub-plate 194 has a ring-shaped base 194a having a diameter or width (e.g., a predetermined diameter or width), a plurality of extending portions 194b extending outwardly from the outer edge of the base 194a, and arc-shaped bending portions 194c extending from ends of the extending portions 194b to a length (e.g., a predetermined length) in the circumferential direction of the base 194a. The base 194a may have a diameter such that a hollow (e.g., an opening) is formed (e.g., is formed at a center thereof) so that the sub-plate 194 does not contact the positive electrode terminal 192. The extending portion 194b may be disposed at a position that approximately covers the crimping part 114b and the end of the gasket 196. The bending portion 194c may be bent along the curved surface of the crimping part 114b to cover a portion of the top end of the side portion 114. Therefore, as shown in FIG. 4, when the secondary battery 10 is viewed from above, the bending portion 194c is not visible.

Although the embodiment shown in FIG. 3 includes a plurality of bending portions 194c that are spaced apart from each other at regular intervals, in other embodiments, the bending portions 194c may be connected to form a single ring shape. After seating the cap plate 191 together with the gasket 196 on the beading part 114a, the crimping part 114b may be formed on (or over) the gasket 196 to fix the cap plate 191, and the sub-plate 194 may then be seated, thereby positioning the bending portion 194c. Then, the outer edge of the base 194a, the extending portion 194b, and the bending portion 194c may be welded to the can 110 and fixed thereto. The welding method may be ultrasonic welding, laser welding, resistance welding, or the like. In this manner, the sub-plate 194 may be welded to the can 110 to be electrically connected thereto, and the first electrode current collector plate 150, which is electrically connected to the negative electrode plate, may be connected to the can 110. Therefore, the sub-plate 194 has the same polarity as the can 110 and, thus, may act as a negative electrode. In addition, because the base 194a of the sub-plate 194 is configured to be connected to the beading part 114a, the area of the beading part 114a may also be used to act as a negative electrode. Accordingly, the area for welding of the negative electrode terminal to the outside (e.g., to an external device or component) is increased, thereby improving welding convenience. The ring-shaped insulation member 195 for insulation may be inserted between the base 194a and the cap plate 191.

As shown in FIGS. 2, 4, and 5, the insulation member 195 may be made of an insulation (or insulating) material having a substantially ring shape. The insulation member 195 may have a width such that the end of the gasket 196 does not contact the outer edge of the positive electrode terminal 192. However, the insulation member 195 is made of the same insulating material as the gasket 196 and, thus, may be in contact with the end of the gasket 196.

The gasket 196 is made of an insulating material and is shaped to surround (e.g., to extend around) the outer edge of the cap plate 191. One end (e.g., a distal end) of the gasket 196 extends beyond the end of the beading part 114*a* to insulate the side portion 114 of the can 110 and the cap plate 191 from each other.

With the afore-constructed cap assembly, both the positive and negative electrode terminals may be provided on the upper portion of a secondary battery, and the welding area of the negative electrode terminal is increased to include the beading part area, thereby improving welding convenience.

However, the above-described sub-plate may be modified in various forms.

Figure 6:
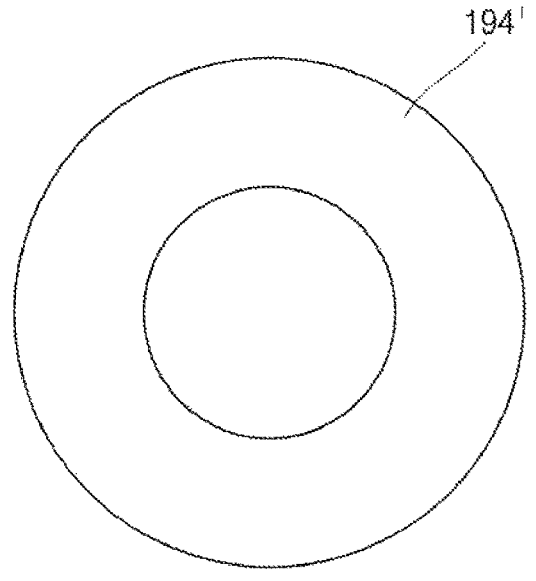
FIG. 6 is a plan view of a sub-plate according to another embodiment of the present disclosure.
Figure 7:
FIG. 7 is a perspective view schematically showing a sub-plate according to another embodiment of the present disclosure.
Figure 7:
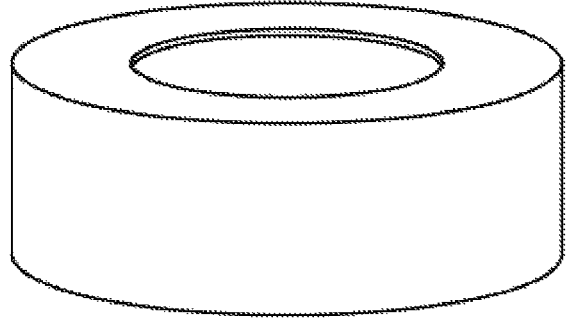

FIG. 6 is a plan view showing a sub-plate according to another embodiment of the present disclosure. FIG. 7 is a perspective view schematically showing a sub-plate according to another embodiment of the present disclosure.

As shown in FIG. 6, a sub-plate 194' may have a ring shape in which the extending portion or the bending portion of the above-described embodiment is omitted. In another embodiment, as shown in FIG. 7, a sub-plate 194" may have a cylindrical shape with an open bottom portion, like an upside-down cup. Even in the embodiments shown in FIGS. 6 and 7, the sub-plates 194' and 194" may have a hollow (e.g., an opening) formed in the top surface thereof to prevent the sub-plates 194' and 194" from contacting the positive electrode terminal 192. The sub-plates 194' and 194" according to the embodiments shown in FIGS. 6 and 7, may be attached to the cap assembly 190 according to the embodiment shown in FIGS. 1 to 5, including having an insulation member provided between the sub-plate and the cap plate.

As described above, according to embodiments of the present disclosure, because both the positive electrode and the negative electrode are provided in one direction (e.g., at one end) of the secondary battery, a connection structure with an external terminal (or external device) can be simplified. In addition, because an additional area for welding the negative electrode terminal is provided, the flatness thereof can be improved, and thus, the welding of the negative electrode terminal can be facilitated.

While the foregoing embodiments are only some embodiments for carrying out the present disclosure, which is not limited to these embodiments, it will be understood by a person skilled in the art that various changes in form and details may be made therein without departing from the spirit and scope of the present disclosure as defined by the following claims and their equivalents.

What is claimed is:

1. A cylindrical secondary battery comprising:
an electrode assembly comprising a first electrode plate and a second electrode plate;
a can having a bottom portion and a cylindrical side portion, accommodating the electrode assembly, and electrically connected to the first electrode plate; and
a cap assembly comprising:
    a cap plate coupled to one end of the side portion of the can and being electrically connected to the second electrode plate;
    a gasket insulating the cap plate and the side portion from each other; and
    a sub-plate covering at least a portion of the cap plate and at least a top portion of the side portion,
wherein the sub-plate comprises:
    a base;
    a plurality of extending portions extending outwardly from an outer edge of the base; and
    arc-shaped bending portions respectively extending from an end of each of the extending portions in a circumferential direction of the base, and
wherein the bending portions have an arc shape that matches a circumferential shape of the side portion of the can.

2. The cylindrical secondary battery of claim 1, wherein the cap assembly further comprises an insulation member comprising an insulating material and being arranged between the sub-plate and the cap plate.

3. The cylindrical secondary battery of claim 2, wherein the can has a beading part adjacent an open end of the side portion and being inwardly concavely bent and a crimping part spaced apart from the beading part and being a bent end of the side portion, and
wherein the sub-plate covers at least a portion of the crimping part.

4. The cylindrical secondary battery of claim 3, wherein the cap plate comprises a positive electrode terminal protruding outwardly from a plate surface, and
wherein the base is ring-shaped between an outer edge of the positive electrode terminal and a top end of the gasket.

5. The cylindrical secondary battery of claim 4, wherein a width or diameter of the base is smaller than a distance between the outer edge of the positive electrode terminal and the top end of the gasket.

6. The cylindrical secondary battery claim 5, wherein at least a portion of the base, at least portions of the extending portions, and the bending portions are welded to the can.

7. The cylindrical secondary battery of claim 1, further comprising:
a first electrode current collector plate electrically connected to the first electrode plate and electrically connected to the bottom portion; and
a second electrode current collector plate electrically connected to the second electrode plate and electrically connected to the cap plate,
wherein the first electrode plate is a negative electrode plate, and the second electrode plate is a positive electrode plate.

\* \* \* \* \*